US 8,671,782 B2
United States Patent
Mink

(10) Patent No.: US 8,671,782 B2
(45) Date of Patent: Mar. 18, 2014

(54) FORCE SENSOR AND CORRESPONDING FORCE MONITORING MATTRESS

(75) Inventor: Jan Mink, Geldrop (NL)

(73) Assignee: 2M Engineering LMT., Veldhoven (NL)

( * ) Notice: Subject to any disclaimer, the term of this patent is extended or adjusted under 35 U.S.C. 154(b) by 292 days.

(21) Appl. No.: 13/054,559

(22) PCT Filed: Jul. 17, 2009

(86) PCT No.: PCT/IB2009/006281
§ 371 (c)(1),
(2), (4) Date: Apr. 15, 2011

(87) PCT Pub. No.: WO2010/007520
PCT Pub. Date: Jan. 21, 2010

(65) Prior Publication Data
US 2011/0185824 A1 Aug. 4, 2011

(30) Foreign Application Priority Data
Jul. 17, 2008 (NL) .................................... 2001822

(51) Int. Cl.
*G01L 1/24* (2006.01)
*G01L 1/04* (2006.01)

(52) U.S. Cl.
USPC ............. 73/862.624; 73/862.621; 73/862.636

(58) Field of Classification Search
USPC ........................ 73/862.624, 862.621, 862.636
See application file for complete search history.

(56) References Cited

U.S. PATENT DOCUMENTS

| 3,875,481 A * | 4/1975 | Miller et al. ............... 361/283.1 |
| 3,996,922 A | 12/1976 | Basham |
| 4,320,766 A * | 3/1982 | Alihanka et al. ............... 600/484 |
| 5,693,886 A * | 12/1997 | Seimiya et al. ................. 73/718 |
| 5,707,045 A | 1/1998 | Easter |
| 5,825,293 A * | 10/1998 | Ahmed et al. ............. 340/573.1 |
| 7,132,953 B2 * | 11/2006 | Young et al. .................. 340/665 |
| 2001/0039681 A1 | 11/2001 | Johnson et al. |
| 2003/0163287 A1 * | 8/2003 | Vock et al. .................... 702/187 |
| 2003/0212352 A1 * | 11/2003 | Kahn .............................. 601/98 |
| 2011/0125063 A1 * | 5/2011 | Shalon et al. ................. 600/590 |
| 2012/0265477 A1 * | 10/2012 | Vock et al. .................... 702/130 |

FOREIGN PATENT DOCUMENTS

| EP | 2000789 A | 12/2008 |
| NL | 7413374 A | 4/1975 |

(Continued)

OTHER PUBLICATIONS

International Search Report for application PCT/IB2009/006281, mailed Oct. 30, 2009.

*Primary Examiner* — Lisa Caputo
*Assistant Examiner* — Jamel Williams
(74) *Attorney, Agent, or Firm* — FSP LLC

(57) ABSTRACT

A force sensor includes a first surface and a second surface located opposite the first surface, the first surface translatable against a resilient force in a direction towards and/or from the second surface; a distance sensor, arranged to measure the distance between the first surface and the second surface; characterized in that the force sensor comprises a flexible coupling extending along the direction, flexibly coupling the first surface to the second surface; and in that the flexible coupling is provided with a resilient means to provide the resilient force; and a space encompassed by the flexible coupling together with the first surface and the second surface being accessible to the distance sensor, the space filled with a medium for providing the resilient force.

11 Claims, 11 Drawing Sheets

(56) References Cited

FOREIGN PATENT DOCUMENTS

| WO | WO 98/22836 A | 5/1998 |
| WO | WO 9822836 A1 * | 5/1998 | ............... G01V 3/08 |
| WO | WO 98/47427 A | 10/1998 |
| WO | WO 2005/059486 A | 6/2005 |
| WO | WO 2007/111182 A | 10/2007 |

* cited by examiner

FORCE SENSOR AND CORRESPONDING FORCE MONITORING MATTRESS

TECHNICAL FIELD

The invention relates to a force sensor comprising: a first surface and a second surface located opposite the first surface, the first surface is translatable against a resilient force in a direction towards and/or from the second surface; and a distance sensor, arranged to measure the distance between the first surface and the second surface.

The invention also relates to a mattress, a respiration measurement device and a pressure sensing system.

The invention also relates to a corresponding method for measuring a force

BACKGROUND ART

Japanese patent JP2000241276 describes a known sensor to measure the pressure of a fluid. The known sensor comprises a diaphragm being flexed upon receiving a pressure to be measured, a first magnet secured to the diaphragm, a second magnet of same polarity secured oppositely to the first magnet, and a Hall element comprising a Hall IC disposed between first and second magnets.

The outer circumferential part of the diaphragm is fitted fixedly in a case of the pressure sensor. To fix the diaphragm a metal is used, for example, stainless steel which has a big intensity and rigidity. This is because an oil pressure that may occur in the sensor is about 10 kgf/cm$^2$ (kilogram-force per square centimeter).

DESCRIPTION OF DRAWINGS

The invention is explained in further detail by way of example and with reference to the accompanying drawings, wherein.

Figure 1:
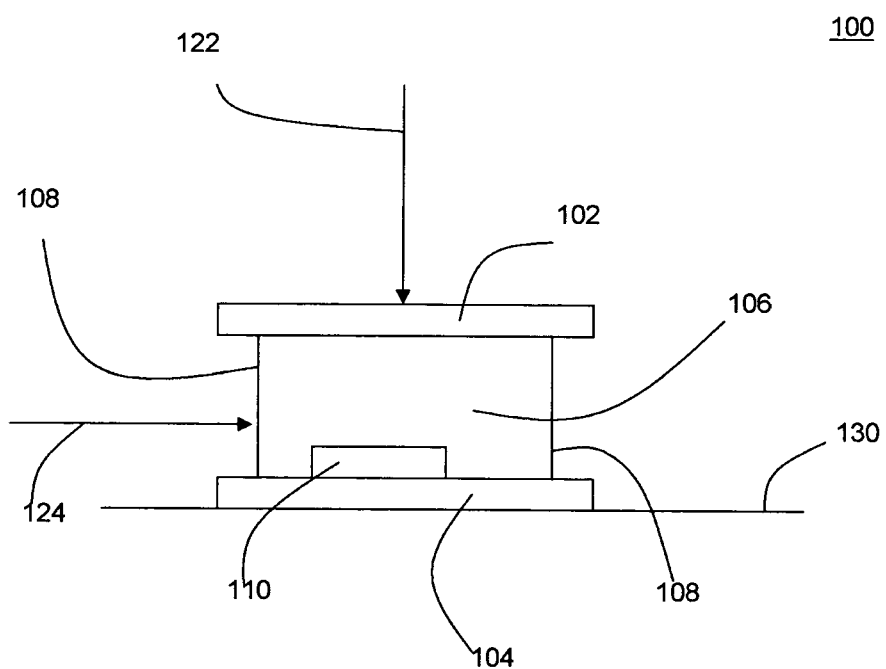
FIG. 1 is a block diagram illustrating a first embodiment of a force sensor according to the invention.

List of Reference Numerals:

| | |
|---|---|
| 100 | a force sensor |
| 102 | a first surface |
| 104 | a second surface |
| 106 | a resilient means |
| 108 | a flexible coupling |
| 110 | a distance sensor |
| 122 | a force |
| 124 | a force |
| 130 | an object |
| 200 | a force sensor |
| 202 | a supporting side |
| 204 | a base side |
| 206 | a space |
| 208 | a resilient body |
| 300 | a force sensor |
| 302 | a closed space |
| 400 | a graph of a measured signal |
| 402 | a respiration cycle |
| 404 | a disturbance |
| 500 | a force sensor |
| 502 | an cross-section line |
| 504 | a flexible cover |
| 506 | a reference line |
| 604 | protection glass |
| 606 | sensor holder |
| 608 | a resilient means holder |
| 702 | a flexible base cover |
| 800 | a pressure sensing system |
| 802 | a body supporting means |
| 804 | a supporting side |
| 806 | a base side |
| 808 | a supporting surface |
| 810 | a space |
| 900 | a heart rate and respiration sensor |
| 902 | a wearing means |
| 904 | an elastic connection |
| 906 | an attachment base |
| 1100 | a mattress |
| 1102 | a force sensor |

INDUSTRIAL APPLICABILITY AND BEST MODE

In the known sensor a diaphragm is fitted fixedly in a metal casing. Upon receiving a pressure the diaphragm flexes inside the rigid casing. It is a problem that the range within which the known sensor can measure is restricted by the range of flexing of the diaphragm.

It is an object of the invention to provide a force sensor with an extended range of measuring.

The object is achieved by the force sensor according to the invention, as defined in claim 1.

The force sensor of the invention is capable of measuring forces applied to the first surface. When a force is applied to the first surface, the first surface, which is translatable, will translate and show a displacement. Since the translation is against a resilient force, at some point the force exerted against the first surface will be balanced against the resilient force, this causes the displacement to be representative of the force exerted on the first surface.

Moreover, since the first surface is coupled to a flexible coupling, the force exerted on the first surface is transferred onto the flexible coupling. The flexible coupling, by virtue of being flexible will flex under this force. Since the first surface is coupled to a flexible coupling, which extends along the direction in which the first surface translates, the range of translation of the first surface is increased compared to a situation where a rigid coupling were used between the first surface and the second surface.

The displacement of the first surface causes the distance between the first surface and the second surface to be different depending on the force exerted against the first surface. Using the distance sensor which is arranged to measure the distance between the first surface and the second surface, the distance between the first surface and the second surface is measured. The measured distance is representative of the displacement of the first surface and therefore representative of the force exerted on the first surface.

It was an insight of the inventor that the range over which a first surface can translate is limited in a construction in which the casing is rigid. By arranging a distance sensor in a casing which comprises a flexible coupling in the direction in which the sensor translates, the range of translating is extended. As a consequence the dynamic range of the sensor is also increased.

In a preferred embodiment of the invention the resilient means comprises a resilient body, in which resilient body the force sensor is embedded.

The flexible coupling has a further advantage in that the sensor can move with the force extended upon it. This means that the sensor according to the invention is suitable for use in applications where a bulky sensor may be problematic. This advantage is enhanced by embodying the resilient means as a resilient body, e.g., a volume of resilient material. In a preferred embodiment of the invention the resilient body is a mattress. When a force exerted by, e.g., heart, lung or movement, etc, of a living subject on the mattress needs to be measured a bulky sensor in the mattress, with a rigid casing may be too uncomfortable for the subject. A sensor with a flexible coupling, especially in conjunction with a resilient body has the advantage of being more comfortable to the subject.

In a preferred embodiment of a force sensor according to the invention the distance sensor is an optical distance sensor.

The force sensor according to the invention provides a large dynamic range, that is, a large ratio between the highest measurable force and the smallest measurable force.

If the force sensor according to the invention is in rest, there is a large distance between the first surface and the second surface. When a force is applied to the first surface, the first surface translates and the distance between the first surface and the second surface reduces. The dynamic range of the force sensor is increased with the range over which the flexible coupling extends. It is found that an optical distance sensor operates at a high dynamic range, since it is found to be capable of converting the translatability of the first surface into a measured signal with a high precision across a range of distances. Advantageously, small pressure differences, e.g., due to hart beats, can be accurately measured across the large operational range of the force sensor.

In a preferred embodiment of force sensor according to the invention the distance sensor is provided upon one of the first surface and the second surface.

It is found to give a production advantage when the distance sensor can be applied during manufacture to one of the first surface and the second surface. In this way the number of, and complexity of manufacturing steps is reduced, as the distance sensor need not be applied and supported in the force sensor at a later stage than the manufacture of the first surface and second surface.

The respiration measurement device comprises a force sensor according to the invention, and a connecting band. A first end of the connecting band is coupled to the first surface and a second end of the connecting band is coupled to the second surface.

The connecting band can be used to wear the force sensor in connection to the chest of a living subject. The respiration measurement device has the advantage that it has such increased sensitivity that it measures the force exerted by the beating of a subject's heart. Moreover, it achieves this in a device which is comfortable to wear.

A pressure sensing system comprises: a mattress, a supporting surface, and a distance sensor. The mattress comprises: a supporting side, a base side and a resilient body supporting means. The mattress is arranged with the base side upon the supporting surface. The supporting side is suitable for supporting a body and the base side is located opposite the supporting side. The mattress comprises a space which includes an open side, which is open towards the supporting surface. Opposite the open side the space has a first surface. The distance sensor is arranged in the space between the supporting surface and the first surface, and is arranged to measure the distance between the first surface and the supporting surface.

The method for measuring a measured force comprises: translating a first surface against a resilient force, in response to the measured force, in a direction towards and/or from a second surface, which second surface is located opposite the first surface; extending and/or shortening a flexible coupling, which flexible coupling extends along the direction; measuring the distance between the first surface and the second surface.

The method for measuring a measured force shares many of the advantages of the force sensor according to the invention. In particular, by extending and/or shortening a flexible coupling, which flexible coupling extends along the direction, the dynamic range and comfort of the method is increased.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In FIG. 1 a block diagram is shown, illustrating a first embodiment of a force sensor 100 according to the invention. Force sensor 100 comprises a first surface 102, a second surface 104, a resilient means 106, a flexible coupling 108, a distance sensor 110.

The first surface can be embodied as a thin, flat disc. Preferably light material is used which may be slightly flexible, but remains its structural integrity under the expected forces. For example, plastic is found to be a good choice for the first surface, also metal, or wood, or any other suitable material may be used.

Second surface 104 is located opposite first surface 102. Second surface 104 can be made of similar material as first surface 102. The force sensor may be optionally attached, possibly securely so, to some object 130. For some applications it may be advantageous to have object 130 and second surface 104 made in one piece, from one material. Second surface 104 and/or object 130 can be made of wood, metal, some synthetic material, such as plastics, etc. Also first surface 102 may be integrated in a larger surface, wherein first surface 102 and the larger surface may also be made out of one piece.

The first surface is translatable, in a direction towards and/or from the second surface.

Between first surface 102 and second surface 104 a flexible coupling 108 is arranged. The flexible coupling may be made from a fabric, such as cloth or canvas, etc. The flexible coupling extends along the direction, flexibly coupling the first surface to the second surface; and in that Flexible coupling 108 is provided with a resilient means 106 to provide the resilient force. For example, a coil spring may be placed between first surface 102 and second surface 104. The coil spring may be placed on either side of the flexible coupling 108. As a further example of resilient means 106, a resilient rubber material may be placed at either side of the flexible coupling 108.

If a gravitational force acts on first surface 102, then the resilient means 106 may be used to support first surface 102. For example, in case resilient means 106 is a coil spring, the spring may support first surface 102 and prevent it from resting on second surface 104.

Distance sensor 110 is arranged to measure the distance between the first surface and the second surface. In the figure, distance sensor 110 is shown positioned on second surface 104. Many other possibilities are possible though. For example, distance sensor 110 may be positioned on first surface 102. Distance sensor 110 may also be positioned in between the two surfaces, measuring the distance to either side from the sensor to each one of first surface 102 and second surface 104.

Distance sensor 110 may be of a directional type that measures the distance between a specific point on first surface 102 and a specific point on second surface 104. Distance sensor 110 may also be of a type that measures the average distance between first surface 102 and second surface 104, or a specific point thereon.

During a first mode of operation a force 122 is applied to first surface 102. Surface 102 is translatable, as it is, in this embodiment supported only be a flexible coupling and possibly a resilient means. Due to force 122 first surface 102 will move towards second surface 104. As first surface 102 moves towards second surface 104 the flexible coupling 108 will decrease in length, when measured in the direction of movement of first surface 102. For example, if force 122 is substantially perpendicular to first surface 102, the first surface 102 will move parallel with flexible coupling 108, towards second surface 104.

Distance sensor 110 which is operable to measure the distance between first surface 102 and second surface 104 will register the decreased distance between first surface 102 and second surface 104. Typically, distance sensor 110 will communicate the measured distance, or a signal which is representative of the measured distance, to a processing device (not shown) outside of force sensor 100.

As the force 122 acts on first surface 102, the resilient means 106 will produce a counter force, countering the force 122. As a result there, is a limitation on the translatability of first surface 102. At some point equilibrium is reached between the resilient counter force generated by resilient means 106 and force 122. At this point the first surface may be substantially still. Variations in force 122 will be accurately translated into variations in the distance between first surface 102 and second surface 104.

When force 122 is released, resilient means 106 will push surface 102 back to its original position. This backward movement is allowed by coupling 108, as it is flexible.

Note that, in this case, where second surface 104 is attached to object 130, the second surface does not move with force 122. This is not necessary though, as long as the translation of first surface 102 is different from a translation of second surface 104, so as to produce a distance differential between first surface 102 and second surface 104 and force 122 can be measured through measuring the distance between first surface 102 and second surface 104.

During a second mode of operation, a force 124 is applied against flexible coupling 108. Force 124 transfers, via the flexible coupling, to the translatable first surface 102. As a result of force 124, first surface 102 will translate in a direction away from the second surface. The distance between first surface 102 and second surface 104 increases in dependence on force 124. The increased distance is measured by distance sensor 110. The measured distance is also in this mode of operation a measure for the size of the applied force, in this case force 124.

Note that the force sensor may be arranged such that one of the two modes of operation is not operable. For example, resilient means 106 may be an elastic coupling between first surface 102 and second surface 104. Such an elastic coupling may be well suited for use with the second mode of operation, as the elastic coupling may be suited to apply a counter force when first surface 102 translates in a direction away from second surface 104. Similarly, a tension coil springs, which is designed to resist stretching may be best suited for the second mode of operation. On the other hand, a compression coil spring, designed to resist being compressed, may be best suited for the first mode of operation.

Distance sensor 110 is preferably an optical distance sensor. For example, distance sensor 110 may comprise a light emitting element, such as a Light-emitting diode (LED), or a laser and a reflected light receiving element. For example, distance sensor 110 is attached to second surface 104, and in between sensor 110 and first surface 102 there is a space. To measure the distance, the light emitting element emits some light, this light is reflected of the second surface. The reflected light is received and measured by the light receiving element. As the first surface translates, in response to a force applied to the force sensor, e.g. force 122 or force 124, etc, the amount of reflected light changes. The light receiving element measures this changing amount of reflected light and communicates it as representative for the distance between first surface 102 and second surface 104. Note that the distance sensor, such as an optical distance sensor, may equally well be applied to first surface 102 instead of to second surface 104. By measuring the amount of reflected light a high relative sensitivity is obtained.

In one implementation a proximity sensor, comprising a LED is used to measure the distance. The LED can be operated by means of short pulse of variable current intensity and the reflected light is measured using a built in photodiode. In this way the signal to noise ratio (SNR) can be optimized by choosing the right operating current in relation to the requirements on optical power. During this pulse the photodiode is measured by for example an analog-to-digital (A2D) converter. Using the method of synchronous detection an even better SNR is possible. An advantage of using an optical sensor is that it can be very sensitive and measure very small pressure variations.

Distance sensor may also be made in two or more parts. For example, distance sensor 110 may be a sensor of Hall type, wherein distance sensor 110 comprises a first magnet, a second magnet and a Hall IC. The first magnet may be positioned on first surface 102, the second magnet on second surface 104 and the Hall IC as some point in between the first surface 102 and the second surface 104.

Also an Eddy current sensor can be used for the distance sensor 110. The Eddy current may comprise a magnetically active means and a conductor. For example, the magnetically active means may be attached, or integrated in one of the first surface 102 and the second surface 104; the conductor may be attached, or integrated in the other one of the first surface 102 and the second surface 104. Both the magnetically active means as the conductor may be made of, e.g., wires which may be woven into a fabric, e.g., sheets or a mattress cover, etc. A first surface 102, comprising such a woven fabric could be fully flexible. Moreover, an Eddy current sensor can also be driven with variable current to increase sensitivity, and also the signals measured using it can be processed using synchronous detection. Typically, the measuring support plane, i.e. first surface 102, is moving along with a body that is moving against it, e.g. as the body is laying against it.

An example of using an Eddy current based distance sensor, is that a first surface 102 may be flexible to the point of altering its shape under stress yet give accurate distance readings.

In a further embodiment, the optical distance sensor is provided with a first optical fiber for carrying light from an external light-source to within the space, and with a second optical fiber for carrying reflected light from the space to an external processing unit. The first optical fiber may be connected to a light emitting element, outside the force sensor 100. Similarly the second optical fiber may be connected to a light receiving element outside force sensor 100.

A space in the force sensor between the first surface 102 and the second surface 104 is advantageously open to the distance sensor 110, that is, the space being filled with a medium that is at least partially transparent for the distance sensor. For an optical distance sensor, a space transparent for light of a wavelength used by the distance sensor 110, is found to be advantageous. For other distance sensors, such as a Hall sensor or some other type of EM sensor, such as an Eddy current sensor, a space can be non-transparent to visible light, yet transparent for a magnetic field. In this way a space may conveniently be filled with a medium of choice, which is compressible and/or translatable under a force applied to first surface 102 and/or flexible coupling 108. Filling a space with a special medium is not necessary though; a space may also be open, filled with air at ordinary outside pressure, or even in open contact with the outside air.

Figure 2:
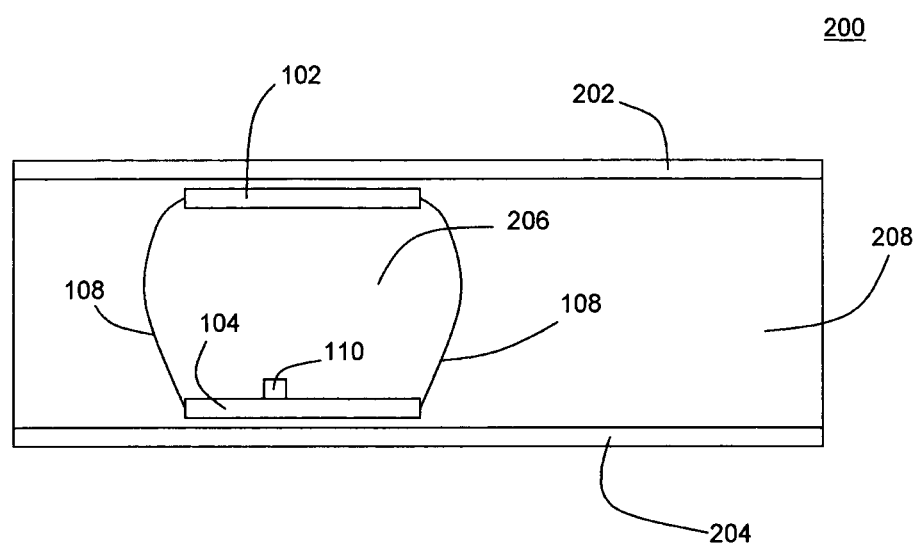
FIG. 2 is a block diagram illustrating a second embodiment of a force sensor according to the invention.

In FIG. 2 a block diagram is shown illustrating a second embodiment of a force sensor 200 according to the invention. Force sensor 200 comprises a resilient body 208. Inside resilient body 208 a space 206 is made. In space 206 a first surface 102 and a second surface 104 is made. First surface 102 is opposite second surface 104. The sides of space 206 are flexible and constitute a flexible coupling between first surface 102 and second surface 104. Optionally the sides of space 206 may be arranged with a further flexible coupling separating space 206 from resilient means 208.

On resilient body 208 a supporting side 202 may be attached, which is flexibly covering first surface 102 and/or resilient body 208. Supporting side 202 is coupled to first surface 102, in that a force applied to supporting side 202 is transferred, at least in part, to first surface 102. At an opposite side of resilient body 208 a base side 204 may be attached. Base side 204 may be more rigid than the resilient body 208.

A distance sensor 110 is arranged to have access to space 206, that is, distance sensor 110 is arranged to measure the distance from first surface 102 to second surface 104. Distance sensors which combine a large operational range with a high sensitivity are particularly advantageous. For example, an optical sensor 110 may be provided upon second surface 104.

During operation a force is applied to supporting side 202. The force is transferred to first surface 102, as force 122. As a result of the force, first surface 102 will translate, against a resilient force, which resilient force is produced by resilient body 208.

In a preferred embodiment, supporting side 202, resilient body 208 and base side 204 constitute a mattress, a cushion, a seating arrangement on a chair, etc. The resilient body 208 may comprise materials such as latex, or other resilient material. The resilient body 208 may also comprise one or more springs, such as coil springs to make the body resilient. Also a spring may be placed inside space 206.

When embedded in a mattress the force sensor is particular well suited to measure the force exerted by a body, e.g. a human or animal body, on the mattress. A human body supported by the mattress may sometimes exert only a small force on the embedded force sensor. For example, only a small force is exerted on the embedded sensor if the human body barely makes contact with the embedded sensor and his only movement is the beat of his heart. On the other hand, if the human body is directly above the sensor, and he coughs violently, the force exerted on the sensor is much higher compared to the small force. Each of these forces, from smaller to larger gives a displacement of the first surface 102. Accordingly, all of these forces are measured by distance sensor 110.

Figure 11:
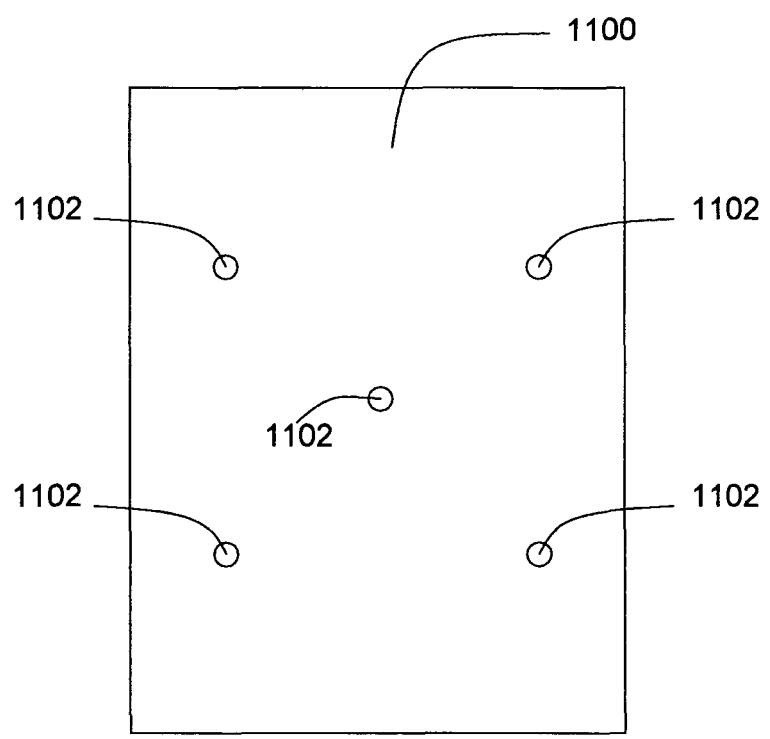
FIG. 11 is a block diagram illustrating multiple force sensors arranged in a mattress Throughout the Figures, similar or corresponding features are indicated by same reference numerals.

Note that multiple sensors may be used to advantage in a single resilient body 208. For example, FIG. 11 shows a top view of a mattress 1100 having five force sensors 1102 integrated into it. Note that the number of five for sensor is just an example, and may be chosen either higher or lower. FIG. 11 shows the first surface 102 of the force sensors. Note that these first surfaces are only indicated schematically. The five first surfaces of sensors 1102 may be embodied as five plastic discs. However, the five first surfaces of sensors 1102 may also all be integrated into one first surface.

Signals measured from the force sensors 1102 may be correlated to reveal further information about a subject laying on the mattress. For example, should it be measured through a sensor at the left side of the mattress, that on the left side of the mattress less pressure is exerted, yet at the right side of the mattress, it is measured through a sensor at the right side of the mattress, that the pressure increases, then it may be deduced that the subject has moved over, or rolled over, from the left side of the mattress to the right side of the mattress. With only a single sensor a measured reduction in pressure may also indicate that the subject has left the mattress, for example, because the subject has fallen out the bed. Using multiple sensors therefore decreases the likelihood that a false alarm is given, e.g. a false alarm that the subject left or fell out of the bed, whereas in reality the subject only moved over.

Moreover, signals measured in multiple force sensors can be combined to increase the signal to noise ratio. For example, the signals may be averaged. Increasing the signal to noise ratio has for example, as an advantage that a signal related to heart beat is more readily discovered in the signal.

Figure 3:
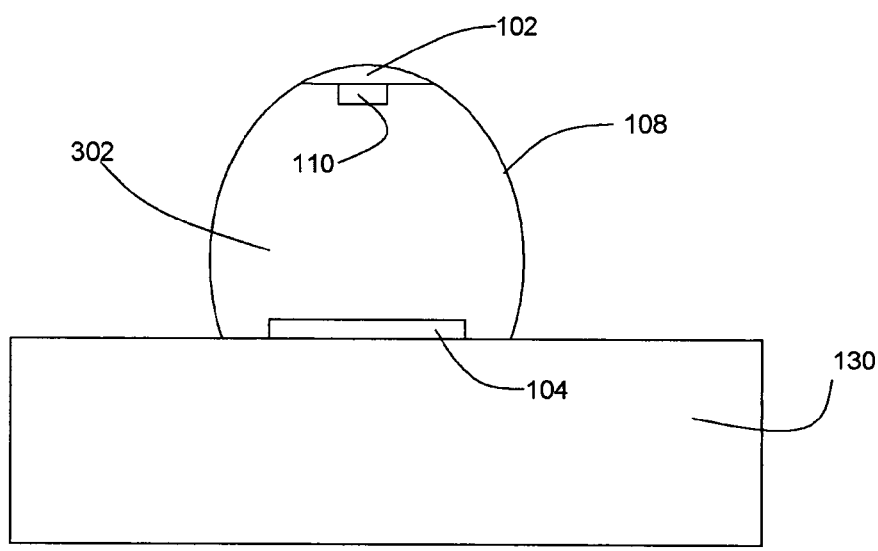
FIG. 3 is a block diagram illustrating a third embodiment of a force sensor according to the invention.

FIG. 3 is a block diagram illustrating a third embodiment of a force sensor 300 according to the invention.

In force sensor 300, a first surface 102, second surface 104 and flexible coupling 108 provide and encompass a space 302 pressurized with a medium. The first surface is supported by the pressure in closed space 302. Closed space 302 constitutes a resilient means, for example, because the closed space comprises a gas under pressure.

First surface 102 may be executed in a flexible material. For example, a fabric such as canvas, etc, may be used. First surface 102 may be executed in the same material as flexible coupling 108. Second surface 104 may optionally also be made from a flexible material. Advantageously, the flexible coupling is made from an elastic material such as rubber.

Distance sensor 110 has access to closed space 302. Distance sensor 110 is shown attached to first surface 102, although distance sensor may also be placed at other positions, such as on second surface 104, inside space 302, etc.

During operation, when a force is applied to first surface 102, the closed space 302 supplies a resilient counter force. The counter force may occur because the medium is compressed, for example, if the medium is a gas, such as air, this may be the source of the resilient counter force. On the other hand, the resilient counter force may also arise out of the perturbed equilibrium in the distribution of the medium. For example, if the medium is a liquid, such as water, e.g. in a water mattress, a force applied to first surface 102 will cause the shape of the medium to take a less energy efficient shape. When the force on first surface 102 is removed the medium returns to substantially its original shape. During operation the sensor may be pressed against an object 130.

An advantage of force sensor 300 is that it is both sensitive to forces applied to first surface 102, in which case the first surface is translated towards the second surface and is also sensitive to forces applied to flexible coupling 108, in which case the first surface translates away from second surface 104.

The pressure in closed space 302 may be varied according to the expected pressure which force sensor 300 is to measure. When the forces are larger, but comparable to the force of outside air pressing on first surface 102, the pressure of the medium in closed space 302 may be taken to be the outside air pressure.

In a preferred embodiment, the invention is applied in an air mattress. The air mattress comprises a space filled with air under a pressure. Inside the space a distance sensor may be applied to measure the displacement of a supporting side of the air mattress with respect to a base side of the mattress. The air in the space constitutes a resilient means. Similarly, the invention may be applied in a water bed.

Figure 4:
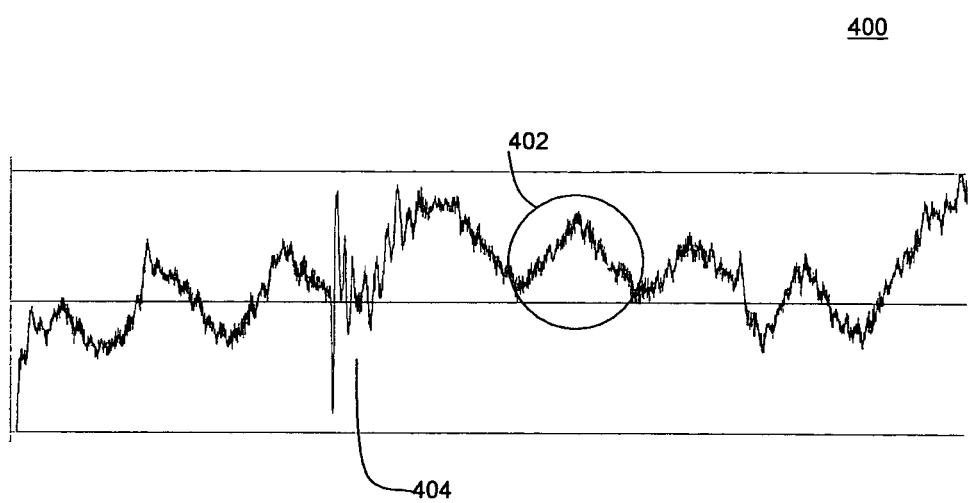
FIG. 4 is a graph illustrating the forces measured in a mattress on which a subject is lying.

In FIG. 4 a graph 400 is shown, illustrating the forces measured in a mattress on which a subject is lying, using the force sensor according to the invention. The sensor used had a dynamic range of 80 dB. Graph 400 shows only 1% of the full dynamic range of the sensor. The graph covers 30 seconds.

Inside the measured signal, three component signals can be identified: a movement signal which corresponds to movements of the subject, i.e., general body activity; a respiration signal which corresponds to breathing of the subject; and a heart signal which corresponds to the beating of the heart of the subject. As graph 400 shows only 1% of the range of the sensor, the movement signal is not visible in graph 400.

At 402 one cycle of breathing is indicated. Superimposed onto this respiration signal, there is a faster and smaller signal, which is caused by the beating of the heart. This heart signal is as small as a few percent of the respiration signal. At 404 a disturbance is shown, caused by the subject coughing. Graph 400 shows that the displacements related to breathing are less than 1% of the full dynamic range.

By applying signal processing to the measured signal as a function of time, the three component signals can be separated based on their different characteristics. For example, a filter bank may be used, with one low-pass band for the movement signal, one mid-band for the respiration signal and one high-band for the heart signal. The movement signal lies in a range of 0.0 Hz to 0.1 Hz. The respiration signal lies in a range of 0.15 Hz to 0.5 Hz. The heart signal lies in a range of 0.5 Hz to 3 Hz. The filters may be implemented using, e.g., Fourier analysis.

A mattress supplied with the force sensor is therefore well suited to monitor, e.g., the respiration and/or the heart beats of, e.g., a patient in a hospital environment. It is an advantage that heart beats, respiration and/or movement can be registered without a direct contact with the patient is needed. In particular the heart can be registered without the need of a sensor in contact with the patient. The registration of the heart beats, respiration and/or movement may be coupled to an alarm installation, which is configured to raise an alarm when the heart beat frequency and/or respiration frequency drops below some predetermined level. Also an alarm may be raised if the subject is found to leave the mattress, an event which shows in a significant reduction in the force exerted on the force sensor.

In an application where the heart signal needs to be obtained from the measured signal it is advantageous to use a distance sensor with a high relative sensitivity, even if this may be at the expense of a high absolute sensitivity. Small variation should be visible in the measured signal.

Figure 5:
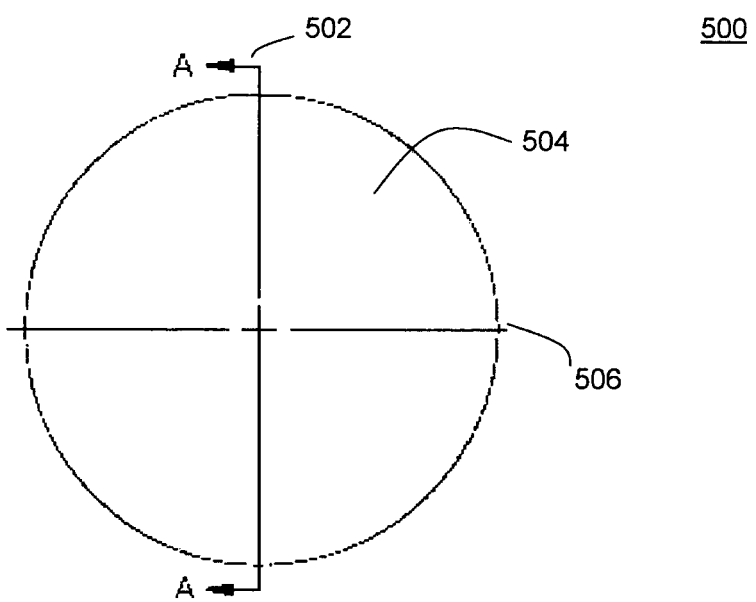
FIG. 5 is a top view of a fourth embodiment of a force sensor according to the invention, indicating intersection line A-A
Figure 6:
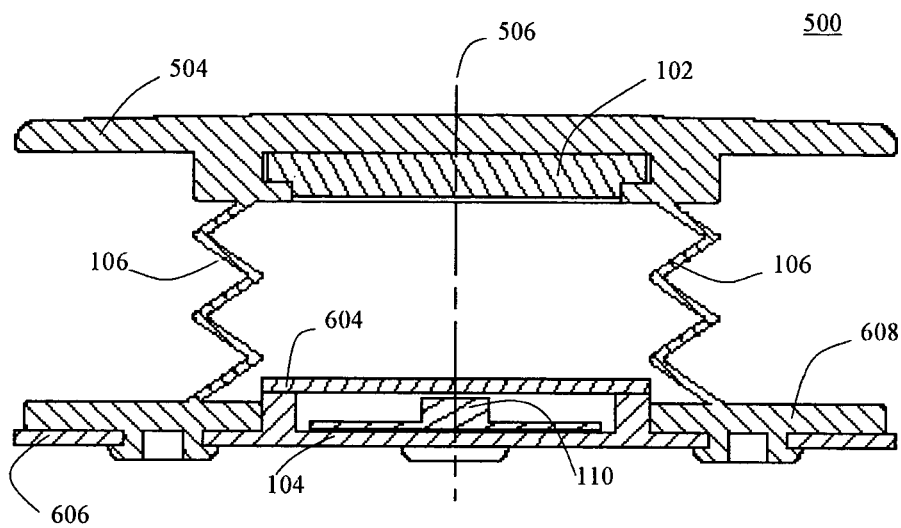
FIG. 6 is an intersectional view of the fourth embodiment of a force sensor according to the invention, along line A-A.
Figure 7:
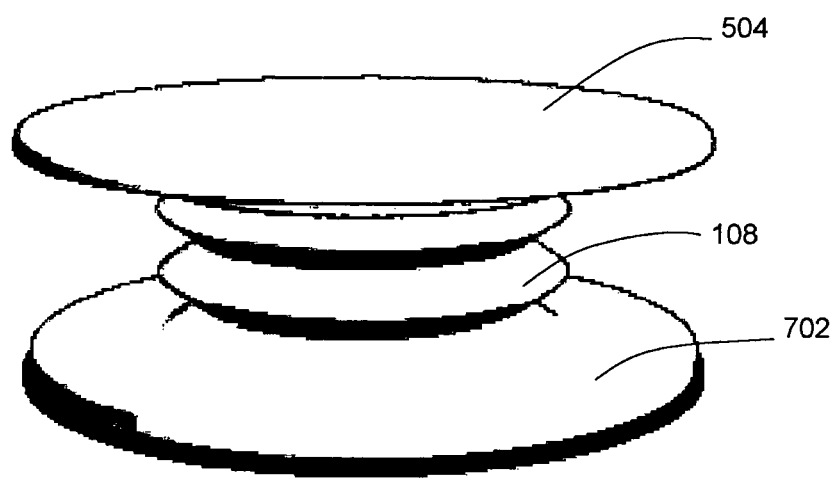
FIG. 7 is an outside view of the fourth embodiment of a force sensor according to the invention.

In FIGS. 5, 6, and 7 a fourth embodiment of a force sensor 500 according to the invention is illustrated. In FIG. 5 a top view of a force sensor 500 is shown. In FIG. 5 an intersection line 502 is shown, also indicated with the letters A-A. Also shown is a reference line 506. In FIG. 6 an intersectional view of force sensor 500 is shown, the intersection being along intersection line 502. In FIG. 7 an outside view of force sensor 500 is shown.

Force sensor 400 comprises sensor holder 606, part of the sensor holder 606 constitutes a second surface 104. Sensor holder 606 holds a distance sensor 110 over second surface 104. Distance sensor 110 is executed as an optical distance sensor. Protecting the distance sensor 110 a protection glass 604 is attached over the distance sensor 110. Connected to sensor holder 606 is a resilient means holder 608. Connected to resilient means holder 608, a resilient means 106 is transversely attached. Resilient means 106 is executed as a spring. A flexible cover 504 is attached to resilient means 106. Coupled to flexible cover 504, or part thereof, is a first surface 102. Alternatively, the flexible coupling may be executed as a harmonica shaped bellow which is not of its own resilient, the resilient means can then be supplied with a coil spring that extends from first surface 102 to second surface 104.

A flexible coupling 108 extends form flexible cover 504 over resilient means 106 to a flexible base cover 702. The flexible base cover 702 covers the resilient means holder 608 and sensor holder 606.

Force sensor 500 is particularly suitable for embedding in a mattress, such that the force a body would exert on the mattress is coupled to the first surface 102.

Figure 8:
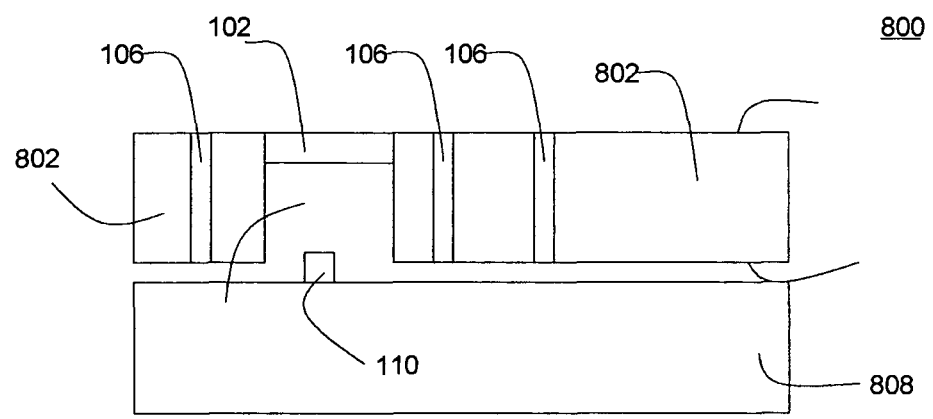
FIG. 8 is a block diagram illustrating a pressure sensing system according to the invention.

In FIG. 8 a block diagram illustrating a pressure sensing system according to the invention. The system comprises a mattress. The mattress comprises a body supporting means 802, a supporting side 804 and a base side 806. In use, the supporting side 804 would be used for supporting a body, e.g., an animal or human body.

Body supporting means 802 may comprise resilient means such as springs. The resilient means may also be supplied by a resilient material, such as latex, of which the body supporting means 802 may be manufactured.

The mattress includes a space 810. Space 810 is open towards the supporting side 806. Inside space 810, and facing the open side, is a first surface 102. First surface 102 may be covered with a reflective material. The mattress is arranged on top of a supporting surface 808. Supporting surface 808 may be a bed base which is suited for receiving a mattress of the shown type. On supporting surface 808 a distance sensor 110 is placed, such that distance sensor 110 is in space 810 when the mattress is arranged on top of the supporting surface 808.

The distance sensor 110 may either be attached securely or in a removable fashion. This arrangement has the advantage that the mattress can be handled separately from the supporting surface 808, e.g. the bed base. The mattress may need more frequent replacement and/or cleaning than the supporting surface 808.

Advantageously, the open side is open for the type of distance sensor employed.

Figure 9:
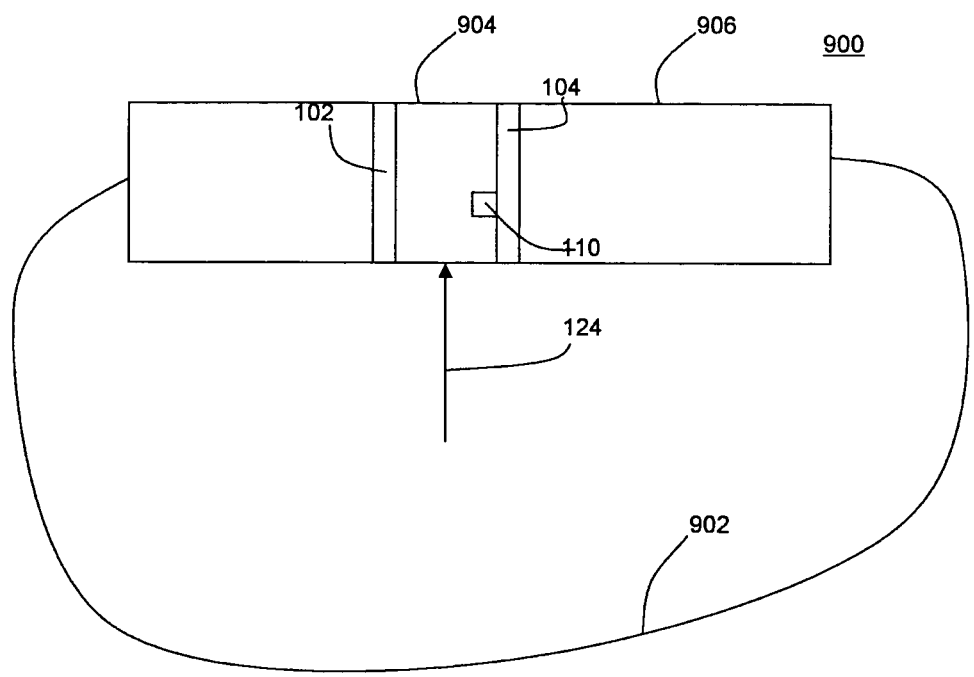
FIG. 9 is a block diagram illustrating a heart rate and respiration sensor according to the invention.

In FIG. 9 a heart rate and respiration sensor 900 according to the invention is shown. Sensor 900 comprises an elastic connection 904. For example, elastic connection 904 may be executed as a tube made from an elastic material. Attached to elastic connection 904 and transversal to it, are a first surface 102 and a second surface 104. Attached to elastic connection 904 is an attachment base 906, connected to which is a wearing means 902. Wearing means 902 is suitable for wearing around the chest of a human or animal body. Wearing means 902 may be executed as a belt, e.g. a leather belt, as an elastic band, etc. Wearing means 902 may be removable from attachment base 906, for example, using a Velcro connection.

On one of the first surface 102 and the second surface 104, e.g. the second surface 104, a distance sensor is applied, e.g. an optical distance sensor.

During operation, the wearing means 902 surrounds the chest of, e.g. a human body. When the chest expands, due to the body breathing in, a force 124 is applied to the elastic connection 904. The first surface 102 and the second surface 104 translate away from each other. This displacement is measured by distance sensor 110. When force 124 reduces, e.g., because the body exhales, the elastic connection 904 pulls the first surface 102 and the second surface 104 back together.

Similarly, when the heart of the body beats, a force is extended on elastic connection 904. The signal produced by the differing forces over time can be analyzed using a form of signal processing, e.g. digital signal processing. In this way the signal can be split in a component corresponding to forces exerted by the heart and a component of forces exerted by the lungs. The signal processing can make use of different characteristics of these components. The heart for example causes much smaller force variations as the lungs do. Consequently large force variations are most likely due to movement of the lungs. Also, both heart and lung produce periodic signals; hence the difference in frequency can be used to separate the two components. For example, the heart has a higher frequency than the lungs.

Figure 10:
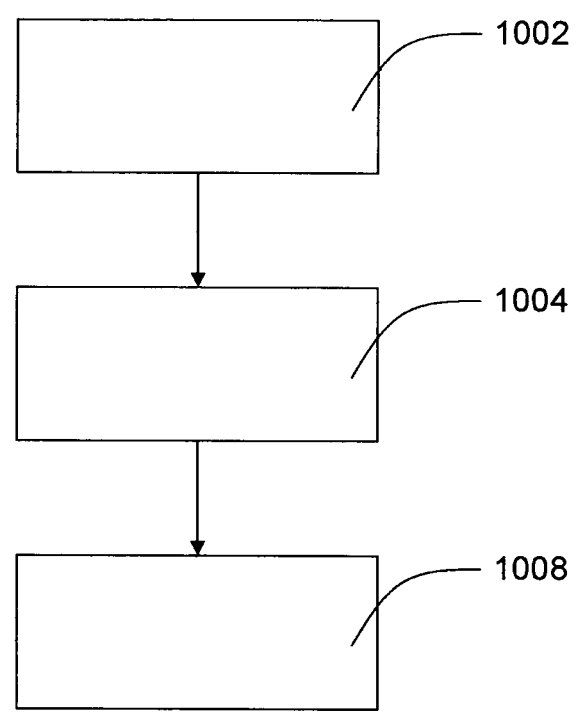
FIG. 10 is a flowchart illustrating a method according to the invention.

In FIG. 10, a flowchart is shown illustrating the method according to the invention.

The method comprises a translating 1002 of a first surface against a resilient force, in response to the measured force, in a direction towards and/or from a second surface, which second surface is located opposite the first surface. Typically in conjunction with the translating 1002 also an extending 1004 and/or shortening of a flexible coupling occurs. The flexible coupling extends along the direction. The translating of the first surface is measured in a measuring 1008 of the distance between the first surface and the second surface.

Additional steps can follow those outlined above. For example, a filtering step operating on the measured signal. The filtering step applies a first band pass filter to obtain a heart signal, a second band pass filter to obtain a respiration signal, a third band pass filter to obtain a movement signal. The movement signal may also be obtain as a moving average of the measured signal.

For example, an alarm step may also follow. When the heart signal shows a heart frequency below a predetermined frequency an alarm may be raised.

The method according to the invention may also be employed with multiple force sensors. A mattress comprising a first force sensor and a second force sensor according to the invention is well suited, for example as shown in FIG. 11. Movement can be determined by correlating the signals measured in the multiple force sensors. In this way more information on how a subject lays on the mattress can be determined. Position of the subject may be determined by monitoring which sensors are measuring the most force. Movement may be determined by determining an increase in the measured force in a first sensor of the multiple sensors and a decrease in the measured force in a second sensor of the multiple sensors.

Detecting the absence of movement may help in preventing decubitus ulcers. For example, a computer program may monitor that no body movement above a certain predetermined level has occurred for some predetermined amount of time, and raise an alarm if so. If the alarm is raised an attendant may assist in moving the subject's body, thereby preventing decubitus ulcers.

Also more complex movement patterns can be determined from the measured signals. For example, the first force sensor is arranged near a first edge of a supporting side of the mattress and the second force sensor is arranged near a second edge of the supporting mattress. Wherein, the second edge runs parallel to the first edge.

The following steps can be taken to detect the subject leaving the mattress: detecting a force above a first predetermined value measured in the left force sensor and the right force sensor; detecting an increase in the force measured in one of the left force sensor and the right force sensor and detecting a decrease in the force measured in the other one of the left force sensor and the right force sensor; detecting a force below a second predetermined value measured in the left force sensor and the right force sensor. The first predetermined value and the second predetermined value should be chosen such that they correspond to expected values in situations where a person lays on the mattress or where a person has left the matter, respectively.

While the invention has been described in conjunction with specific embodiments, it is evident that many alternatives, modifications, permutations and variations will become apparent to those of ordinary skill in the art in light of the foregoing description.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A force sensor comprising:
 a first surface and a second surface located opposite the first surface, the first surface is translatable against a resilient force in a direction towards and/or from the second surface;
 a distance sensor, arranged to measure the distance between the first surface and the second surface;
 characterized in that the force sensor comprises a flexible coupling extending along the direction, flexibly coupling the first surface to the second surface; and in that the flexible coupling is provided with a resilient means to provide the resilient force; and a space encompassed by the flexible coupling together with the first surface and the second surface being accessible to the distance sensor, the space filled with a medium for providing the resilient force.

2. A force sensor as in claim 1, wherein the resilient means comprises a spring.

3. A force sensor as in claim 1, wherein the flexible coupling comprises an elastic connection from the first surface to the second surface to constitute the resilient means.

4. A force sensor as in claim 1, wherein the resilient means comprises a resilient body, in which resilient body the force sensor is embedded.

5. A force sensor as in claim 1, wherein the distance sensor is an optical distance sensor.

6. A force sensor as in claim 1, wherein the distance sensor is provided with a first optical fiber for carrying light from an external light-source to within the space, and with a second optical fiber for carrying reflected light from the space to an external processing unit.

7. A force sensor as in claim 1, wherein the distance sensor is provided upon one of the first surface and the second surface.

8. A force sensor as in claim 4, wherein the resilient body is a mattress.

9. A pressure sensing system comprising: a mattress, a supporting surface, and a distance sensor; wherein
the mattress comprises: a supporting side, a base side and a resilient body supporting means;
the mattress is arranged with the base side upon the supporting surface;
the supporting side is suitable for supporting a body and the base side is located opposite the supporting side, the mattress comprises a space which includes an open side, which is open towards the supporting surface, opposite the open side the space has a first surface; the distance sensor is arranged in the space between the supporting surface and the first surface, and is arranged to measure the distance between the first surface and the supporting surface;
the space filled with a medium for providing a resilient force.

10. A method for measuring a measured force comprising:
translating a first surface against a resilient force, in response to the measured force, in a direction towards and/or from a second surface, which second surface is located opposite the first surface;
measuring the distance between the first surface and the second surface;
characterized in that the method comprises extending and/or shortening a flexible coupling, which flexible coupling extends along the direction;
the resilient force provided by a medium in a space between the first and second surfaces.

11. A method as in claim 10, for use in a mattress with a first force sensor and a second force sensor; the method comprises the following step:
determining a movement in a body located on the mattress by determining an increase in the measured force in the first sensor and a decrease in the measured force in the second sensor.

* * * * *